US012564944B2

(12) United States Patent
Liu

(10) Patent No.: US 12,564,944 B2
(45) Date of Patent: Mar. 3, 2026

(54) ROBOT AND ROBOT CONTROL METHOD

(71) Applicant: Beijing Youzhuju Network Technology Co., Ltd., Beijing (CN)

(72) Inventor: Yunfei Liu, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 33 days.

(21) Appl. No.: 18/569,087

(22) PCT Filed: Sep. 27, 2022

(86) PCT No.: PCT/CN2022/121582
§ 371 (c)(1),
(2) Date: Dec. 11, 2023

(87) PCT Pub. No.: WO2023/093276
PCT Pub. Date: Jun. 1, 2023

(65) Prior Publication Data
US 2024/0278420 A1 Aug. 22, 2024

(30) Foreign Application Priority Data
Nov. 25, 2021 (CN) .......................... 202111413539.6

(51) Int. Cl.
*B25J 9/16* (2006.01)
*B25J 5/00* (2006.01)
(Continued)

(52) U.S. Cl.
CPC .............. *B25J 9/162* (2013.01); *B25J 5/007* (2013.01); *B25J 19/0091* (2013.01);
(Continued)

(58) Field of Classification Search
CPC ........ B25J 9/162; B25J 5/007; B25J 19/0091; B25J 9/16; B25J 13/08; B25J 17/02;
(Continued)

(56) References Cited

U.S. PATENT DOCUMENTS 7,314,220 B2 * 1/2008 Turturiello ........... A61G 5/1078
280/5.513
2002/0174515 A1 11/2002 Strong
(Continued)

FOREIGN PATENT DOCUMENTS

CN 102022473 A 4/2011
CN 204942394 U 1/2016
(Continued)

OTHER PUBLICATIONS

Office Action for Chinese Patent Application No. 202111413539.6, mailed on Mar. 28, 2025, 13 pages.
(Continued)

*Primary Examiner* — Kira Nguyen
(74) *Attorney, Agent, or Firm* — Astute IP Law Group

(57) ABSTRACT

A robot and a robot control method are provided. The robot includes: a robot body, a pose detector being mounted on the robot body; a chassis body provided at a bottom of the robot body; a moving assembly connected to the robot body through a suspension shock absorber, the moving assembly being further connected to a controllable damping rotating shaft, and rotationally connected to the chassis body through the controllable damping rotating shaft; and a controller electrically connected to the pose detector and the controllable damping rotating shaft, respectively, and used to control the controllable damping rotating shaft to change rotational resistance according to pose information of the robot detected by the pose detector.

16 Claims, 4 Drawing Sheets

(51) Int. Cl.
    *B25J 19/00*      (2006.01)
    *B60G 17/016*      (2006.01)

(52) U.S. Cl.
    CPC ...... *B60G 17/0164* (2013.01); *B60G 2202/30* (2013.01); *B60G 2204/62* (2013.01); *B60G 2400/05* (2013.01); *B60G 2500/104* (2013.01); *B60G 2600/182* (2013.01); *B60G 2600/22* (2013.01); *B60G 2800/01* (2013.01); *B60G 2800/912* (2013.01)

(58) Field of Classification Search
    CPC ..... B25J 19/00; B25J 9/1674; B60G 17/0164; B60G 2202/30; B60G 2204/62; B60G 2400/05; B60G 2500/104; B60G 2600/182; B60G 2600/22; B60G 2800/01; B60G 2800/912; F16F 9/53
    USPC ........................................................ 700/250
    See application file for complete search history.

(56) References Cited

U.S. PATENT DOCUMENTS

| | | | |
|---|---|---|---|
| 2003/0102193 A1 | 6/2003 | Edmondson et al. | |
| 2004/0262859 A1 | 12/2004 | Turturiello et al. | |
| 2011/0313568 A1* | 12/2011 | Blackwell | B25J 9/1045 |
| | | | 901/1 |
| 2015/0257902 A1 | 9/2015 | Martin | |
| 2019/0327394 A1 | 10/2019 | Ramirez Luna et al. | |
| 2021/0122030 A1* | 4/2021 | Zhao | B25J 19/0091 |
| 2021/0323621 A1 | 10/2021 | Zhou et al. | |
| 2021/0347060 A1* | 11/2021 | Byl | B25J 11/009 |
| 2022/0111508 A1* | 4/2022 | Kim | B25J 19/0091 |

FOREIGN PATENT DOCUMENTS

| | | | | |
|---|---|---|---|---|
| CN | 107902006 A | 4/2018 | | |
| CN | 108058755 A | 5/2018 | | |
| CN | 108368910 A | 8/2018 | | |
| CN | 208155610 U | 11/2018 | | |
| CN | 208746112 U | 4/2019 | | |
| CN | 111531523 A | 8/2020 | | |
| CN | 211327907 U | 8/2020 | | |
| CN | 108058755 B | * 9/2020 | ........ B60G 17/0165 |
| CN | 214226146 U | 9/2021 | | |
| GB | 1264679 A | 2/1972 | | |

OTHER PUBLICATIONS

Office Action for Chinese Patent Application No. 202111413539.6, mailed on Oct. 25, 2025, 14 pages.

* cited by examiner

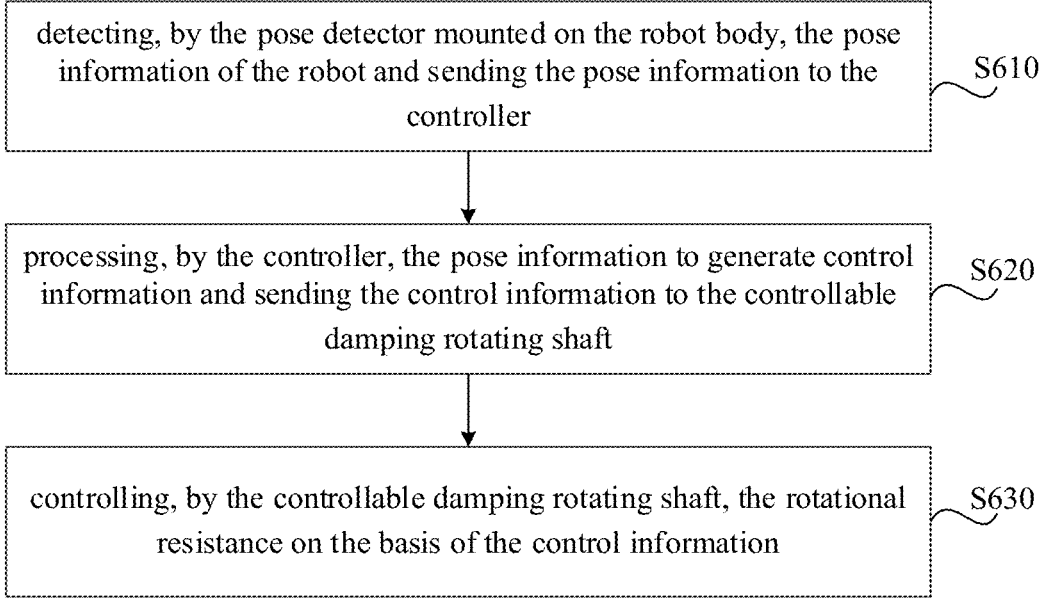

detecting, by the pose detector mounted on the robot body, the pose information of the robot and sending the pose information to the controller ⁓ S610 processing, by the controller, the pose information to generate control information and sending the control information to the controllable damping rotating shaft ⁓ S620 controlling, by the controllable damping rotating shaft, the rotational resistance on the basis of the control information ⁓ S630

FIG. 6

ROBOT AND ROBOT CONTROL METHOD

CROSS-REFERENCE OF RELATED APPLICATION

This is a national stage application filed under 37 U.S.C. 371 based on International Patent Application No. PCT/CN2022/121582, filed Sep. 27, 2022, which claims priority to Chinese patent application No. 202111413539.6 filed on Nov. 25, 2021 with a title of "robot and robot control method". The disclosures of which are incorporated herein by reference in their entireties.

TECHNICAL FIELD

The present disclosure relates to the technical field of robots, and in particular, to a robot and a robot control method.

BACKGROUND

With the rapid development of hardware and control technology, robots are increasingly used in the daily work and life of the people. When a robot is running, shock absorption performance and stability are issues that must be considered.

In related technologies, suspension shock absorbers can be provided to reduce the vibration of the robot chassis. However, this setting method cannot take into account the shock absorption performance of the robot chassis and the stability of the robot body.

TECHNICAL SOLUTION

This content section is provided to introduce ideas in a brief form, which will be described in detail in the detailed description section later. This content section is not intended to identify key features or essential features of the claimed technical solution, nor is it intended to limit the scope of the claimed technical solution.

In the first aspect, the embodiments of the present disclosure provides a robot, including: a robot body, a pose detector being mounted on the robot body; a chassis body provided at a bottom of the robot body; a moving assembly connected to the robot body through a suspension shock absorber, the moving assembly being further connected to a controllable damping rotating shaft, and rotationally connected to the chassis body through the controllable damping rotating shaft; and a controller electrically connected to the pose detector and the controllable damping rotating shaft, respectively, and used to control the controllable damping rotating shaft to change rotational resistance according to pose information of the robot detected by the pose detector.

In the second aspect, the embodiments of the present disclosure provide a robot control method applied to the robot in the first aspect, the method includes: detecting, by the pose detector mounted on the robot body, pose information of the robot and sending the pose information to the controller; processing, by the controller, the pose information to generate control information, and sending the control information to the controllable damping rotating shaft; and controlling, by the controllable damping rotating shaft, rotational resistance on a basis of the control information.

In the robot according to the embodiments of the present disclosure, when the robot body swings, the controllable damping rotating shaft and the suspension shock absorber can jointly provide an acting force opposite to the swing direction of the robot body. Therefore, even if a small suspension stiffness is set, the stability of the robot body can also be ensured, thereby taking into account the shock absorption performance of the robot chassis and the stability of the robot body. In addition, because the rotational resistance is used to passively stabilize the pose of the robot, the energy consumption is low.

Other features and advantages of the present disclosure will be described in detail in the subsequent embodiments.

BRIEF DESCRIPTION OF THE DRAWINGS

The above and other features, advantages and aspects of the embodiments of the present disclosure will become more clear with reference to the following detailed description taken in conjunction with the accompanying drawings. Throughout the drawings, the same or similar reference numerals indicate the same or similar elements. It should be understood that the drawings are schematic, and the components and elements are not necessarily drawn to scale. In the attached drawings:

FIG. 6 is a flow chart of a robot control method according to an exemplary embodiment of the present disclosure.

EXPLANATION OF REFERENCE NUMERALS

Figure 1:
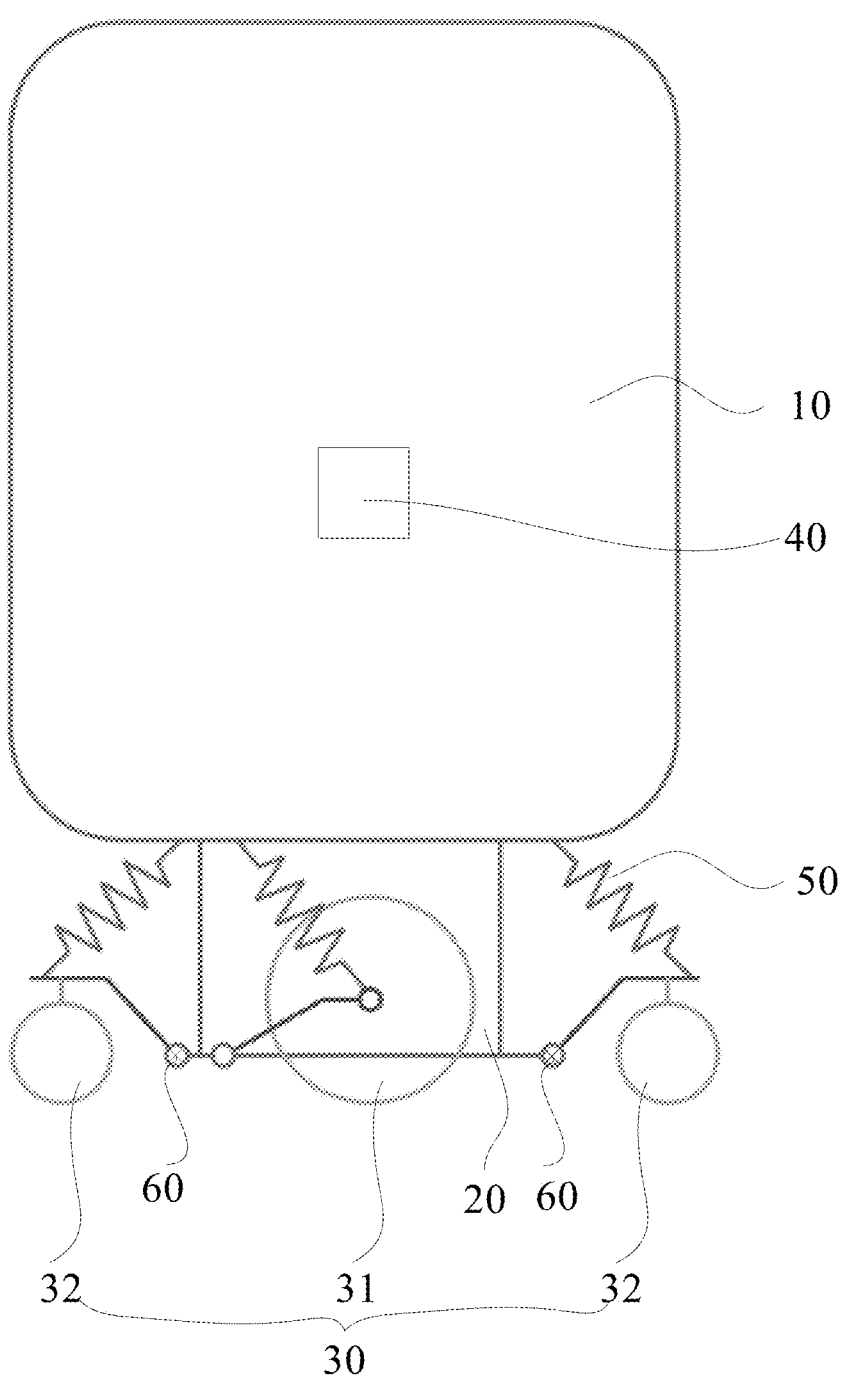
FIG. 1 is a schematic structural diagram of a robot according to an exemplary embodiment of the present disclosure.

10—robot body, 20—chassis body, 30—moving assembly, 31—driving wheel, 32—balance wheel, 40—pose detector, 50—suspension shock absorber, 60—controllable damping rotating shaft, 61—direct current (DC) motor, 62—DC motor output shaft, 63—rotating shaft, 64—magnetorheological material, 71—electronically controlled resistor, 72—frequency switch, 80—connecting rod.

DETAILED DESCRIPTION

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

The names of messages or information exchanged between a plurality of devices in the embodiment of the present disclosure are only used for illustrative purposes, and are not used to limit the scope of these messages or information.

The inventor(s) found in the research that in related technologies, the shock absorption performance of the robot chassis is related to the stiffness of the suspension shock absorber (hereinafter referred to as suspension stiffness). Setting a low suspension stiffness usually helps improve the shock absorption performance of the chassis. However, when the robot accelerates, decelerates, crosses obstacles, passes through potholes, or the like, due to insufficient suspension stiffness, the robot body will be caused to shake, thus reducing the stability of the robot. Although setting a high suspension stiffness can improve the stability of the robot body, the shock absorption performance of the chassis will be sacrificed. Therefore, for robots in related technologies, the shock absorption performance of the robot chassis and the stability of the robot body are not taken into account.

Therefore, the present disclosure provides a robot and a robot control method. When the robot body swings, the controllable damping rotating shaft and the suspension shock absorber jointly provide an acting force opposite to the swing direction of the robot body. Therefore, even if a small suspension stiffness is set, the stability of the robot body can also be ensured, thereby taking into account the shock absorption performance of the robot chassis and the stability of the robot body.

Please refer to FIG. 1, which illustrates a robot according to an exemplary embodiment of the present disclosure. The robot includes a robot body 10, a chassis body 20, a moving assembly 30, and a controller.

In the robot, the pose detector 40 is mounted on the robot body 10; the chassis body 20 is provided at the bottom of the robot body 10; the moving assembly 30 is connected to the robot body 10 through the suspension shock absorber 50, and the moving assembly 30 is also connected to the controllable damping rotating shaft 60 and is rotationally connected to the chassis body 20 through the controllable damping rotating shaft 60; and the controller is electrically connected to the pose detector 40 and the controllable damping rotating shaft 60, and is used to control the controllable damping rotating shaft 60 to change rotational resistance according to the robot pose information detected by the pose detector 40.

In the robot, the pose detector 40 is used to detect the pose information of the robot during operation. In some embodiments, the pose detector 40 may be a pose sensor, the pose sensor may be a sensor based on horizontal position detection, so that the pose information of the robot is detected through the horizontal position of the robot body 10.

In the robot, pose information can be expressed in multiple ways.

In some embodiments, pose information can be simply expressed as whether titling is involved and by the direction of tilt. In this case, pose information can include tilting to the left, tilting to the right, not tilting, etc.

In other embodiments, pose information can be expressed in a more refined manner. In this case, pose information can include a pose swing amplitude, for example, 5 degrees, 15 degrees, −20 degrees, etc.

It should be noted that whether the pose swing amplitude is positive or negative indicates the direction of tilt. For example, when the pose swing amplitude is positive, it means that the robot body 10 tilts to the left, and when the pose swing amplitude is negative, it means that the robot body 10 tilts to the right.

In the robot, the controllable damping rotating shaft 60 can be understood as a rotating shaft whose rotational resistance can be changed.

In the robot, the moving assembly 30 is used to realize normal movement during the operation of the robot, for example, forward movement at a constant speed, backward movement at a constant speed, forward acceleration movement, forward deceleration movement, backward acceleration movement, backward deceleration movement, and so on.

In the embodiments of the present disclosure, as illustrated in FIG. 1, the moving assembly 30 is connected to the robot body 10 through the suspension shock absorber 50, and the moving assembly 30 is rotationally connected to the chassis body 20 through the controllable damping rotating shaft 60. Therefore, when the moving assembly 30 is subject to vibration, the vibration can be offset by the suspension shock absorber 50, thereby reducing the vibration of the chassis body 20 and realizing the function of shock absorption. In this case, the controllable damping rotating shaft 60 functions as a traditional rotating shaft, that is, it adapts to the rotation of the moving assembly 30 during vibration.

However, when the robot body 10 swings, for example, when the robot body 10 in FIG. 1 tilts to the left, the robot body 10 will rotate around the controllable damping rotating shaft 60 on the left side. If the rotation is not restricted, the swing amplitude of the robot body 10 will be very large, and when the swing amplitude exceeds a certain range, the robot body 10 may fall over. Faced with this situation, in the embodiments of the present disclosure, on the one hand, the suspension shock absorber 50 on the left side can provide an acting force opposite to the swing direction of the robot body 10. However, due to the low suspension stiffness, the ability to restrict swing of the robot is limited. Therefore, on the other hand, the rotational resistance of the controllable damping rotating shaft 60 on the left side can also be changed through the controller, so that the controllable damping rotating shaft 60 on the left side also provides an acting force opposite to the swing direction of the robot body 10. As such, the swing amplitude of the robot body 10 to the left is jointly reduced through the suspension shock absorber 50 on the left side and the controllable damping rotating shaft 60 on the left side, thereby improving the stability of the robot body 10.

When the robot body 10 swings, the controllable damping rotating shaft 60 and the suspension shock absorber 50 can jointly provide an acting force opposite to the swing direction of the robot body 10. Therefore, even if a small suspension stiffness is set, the stability of the robot body 10 can also be ensured, thereby taking into account the shock absorption performance of the robot chassis and the stability of the robot body 10.

In addition, because the rotational resistance is used to passively stabilize the pose of the robot, the energy consumption is low.

It can be understood that in some embodiments, other structures such as mechanical arms, grippers, sensors having other functions, and the like can be provided on the robot body 10 according to the actual working needs of the robot. The drawings in the embodiments of the present disclosure only briefly describe the structure of each part of the robot, and they should not be understood as limiting the structure of each part of the robot.

In some embodiments, the controllable damping rotating shaft 60 includes a rotating damping control device and a rotating shaft 63, the rotating damping control device is electrically connected to the controller, and the rotating shaft 63 is connected to the moving assembly 30 through the connecting rod 80.

In the robot, the rotational resistance of the rotating shaft 63 can be changed through the rotating damping control device.

In addition, the rotating shaft 63 is connected to the moving assembly 30 through the connecting rod 80, so that the rotating shaft 63 can adapt to the rotation of the moving assembly 30 around the rotating shaft 63 relative to the chassis body 20 due to vibration or swing of the robot body 10. In addition, the chassis body 20 is provided with a shaft hole, and the rotating shaft 63 is provided in the corresponding shaft hole.

In the robot, because the rotating shaft 63 is connected to the moving assembly 30 through the connecting rod 80, the connecting rod 80 and the rotating shaft 63 are also connected. In the embodiments of the present disclosure, the connecting rod 80 and the rotating shaft 63 can be connected in a variety of connection ways, for example, the connecting rod 80 can be connected to the end of the rotating shaft 63 and the connecting rod 80 can also be connected to the circumferential surface of the rotating shaft 63. In some embodiments, the rotating shaft 63 is perpendicular to the connecting rod 80.

In the embodiments of the present disclosure, providing the connecting rod 80 can improve the force bearing condition of the moving assembly 30, so that the connection between the moving assembly 30, the chassis body 20 and the suspension shock absorber 50 is more reasonable.

Figure 2:
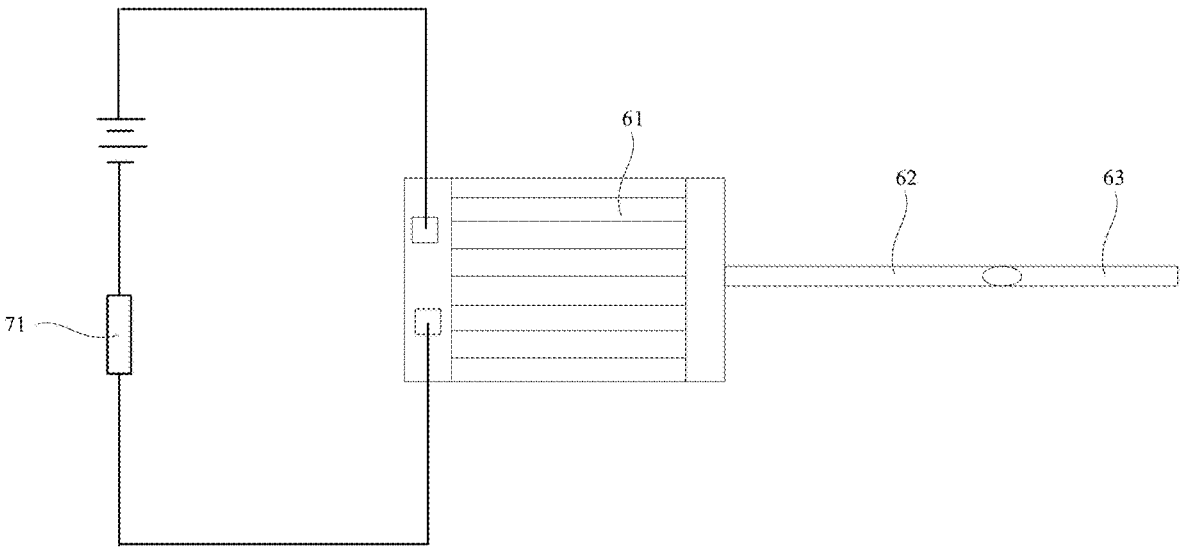
FIG. 2 is a schematic diagram of a connection structure of a variable damping rotating shaft according to an exemplary embodiment of the present disclosure.

In some embodiments, as illustrated in FIG. 2, the rotating damping control device includes a DC motor 61, the electronically controlled resistor 71 is connected in series in the power supply line of the DC motor 61, and the end of the DC motor output shaft 62 is fixedly connected to the end of the rotating shaft 63.

In the embodiments of the present disclosure, the electronically controlled resistor 71 refers to a resistor whose value of resistance can be controlled electronically. By connecting the electronically controlled resistor 71 in series in the power supply line of the DC motor 61, when the value of resistance of the electronically controlled resistor 71 is controlled to become zero, the power supply line of the DC motor 61 is short-circuited and the resistance is maximum at this time. Because the end of the DC motor output shaft 62 is fixedly connected to the end of the rotating shaft 63, the resistance of the rotating shaft 63 is made maximum. When the value of resistance of the electronically controlled resistor 71 is controlled to become infinitely great, the power supply line of the DC motor 61 is disconnected and the resistance is minimum at this time. Because the end of the DC motor output shaft 62 is fixedly connected to the end of the rotating shaft 63, the resistance of the rotating shaft is made minimum. When the value of resistance of the electronically controlled resistor 71 is controlled to be a certain value, the resistance can be adjusted between the maximum value and the minimum value.

Figure 3:
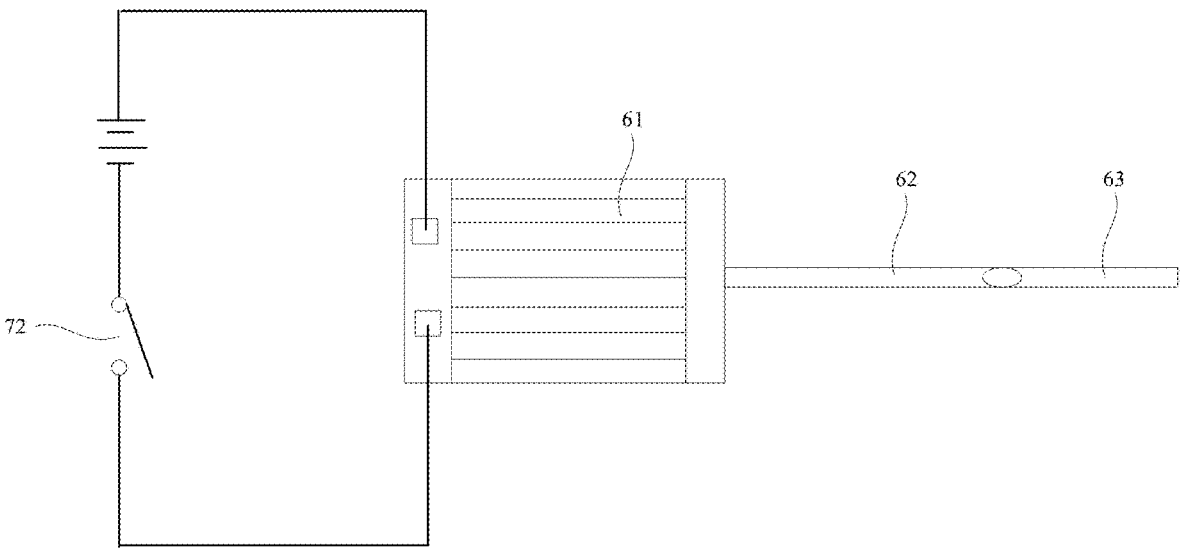
FIG. 3 is a schematic diagram of a connection structure of another variable damping rotating shaft according to an exemplary embodiment of the present disclosure.

In other embodiments, as illustrated in FIG. 3, the rotating damping control device includes a DC motor 61, the frequency switch 72 is connected in series in the power supply line of the DC motor 61, and the end of the DC motor output shaft 62 is fixedly connected to the end of the rotating shaft 63.

In the embodiments of the present disclosure, the frequency switch 72 is connected in series in the power supply line of the DC motor 61. When the frequency switch 72 is controlled to be closed, the power supply line of the DC motor 61 is short-circuited, and the resistance is maximum at this time. Because the end of the DC motor output shaft 62 is fixedly connected to the end of the rotating shaft 63, the resistance of the rotating shaft 63 is made maximum. When the control frequency switch 72 is controlled to be opened, the power supply line of the DC motor 61 is disconnected, and the resistance is minimum at this time. Because the end of the DC motor output shaft 62 is fixedly connected to the end of the rotating shaft 63, the resistance of the rotating shaft 63 is made minimum. When the frequency switch 72 is controlled to be closed at a certain duty ratio, the resistance can be adjusted between the maximum value and the minimum value.

In addition, it should be noted that when the DC motor 61 is not working, i.e., when the power supply line of the DC motor 61 is disconnected, the DC motor output shaft 62 can rotate under the action of external force.

In the robot, the fixed connection between the end of the DC motor output shaft 62 and the end of the rotating shaft 63 may be, for example, welding.

In addition, in some embodiments, the DC motor output shaft 62 can also be directly used as the rotating shaft 63.

In other embodiments, the rotating damping control device includes a magnetic field excitation device and a magnetorheological material 64. The magnetorheological material 64 is provided in the gap between the rotating shaft 63 and the shaft hole where the rotating shaft 63 is located.

Figure 4:
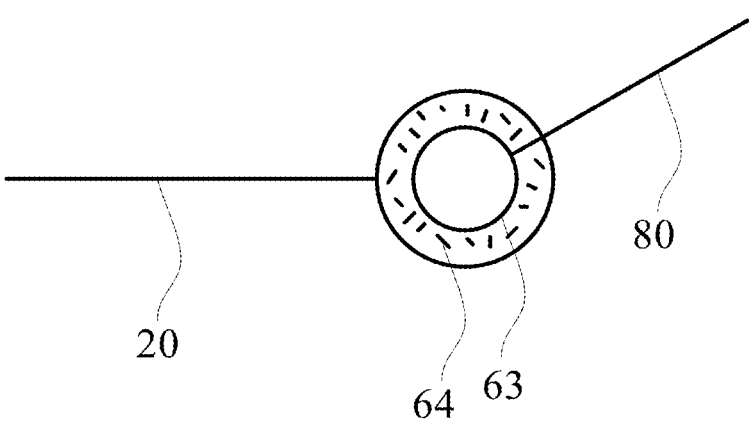
FIG. 4 is a schematic diagram of the positional relationship between a magnetorheological material and a rotating shaft according to an exemplary embodiment of the present disclosure.

Please refer to FIG. 4, which illustrates a schematic diagram of the positional relationship between the magnetorheological material 64 and the rotating shaft 63. As illustrated in FIG. 4, the magnetorheological material 64 is provided in the gap between the rotating shaft 63 and the shaft hole where the rotating shaft 63 is located.

In the embodiments of the present disclosure, the magnetorheological material 64 is provided in the gap between the rotating shaft 63 and the shaft hole where the rotating shaft 63 is located. Thus, when the external magnetic field of different sizes is excited by the magnetic field excitation device, the external magnetic field can interact with the magnetorheological material 64 to change the fluidity of the magnetorheological material 64, thereby controlling the resistance of rotation of the rotating shaft 63.

In some embodiments, as illustrated in FIG. 1, the moving assembly 30 includes a driving wheel 31 and a balance wheel 32. The driving wheel 31 and the balance wheel 32 are connected to the robot body 10 through the suspension shock absorbers 50, respectively. The balance wheel 32 is rotationally connected to the chassis body 20 through the controllable damping rotating shaft 60.

In the robot, the driving wheel 31 can be understood as a wheel that actively drives the robot to move. The driving wheel 31 can be, for example, a hub motor or a traditional motor-driven wheel. The balance wheel 32 is a wheel used to support the robot to maintain balance and is not the power source of the robot. The balance wheel 32 can be, for example, a universal wheel.

In the embodiments of the present disclosure, the arrangement of the driving wheel 31 and the balance wheel 32 jointly maintains the stability of the robot during normal operation. In addition, by providing the balance wheel 32, the number of driving wheels 31 can be reduced, thereby reducing the power settings of the robot and saving costs.

In the robot, the moving assembly 30 can be provided in a variety of ways, that is, the driving wheel 31 and the balance wheel 32 can be provided in a variety of ways.

Figure 5:
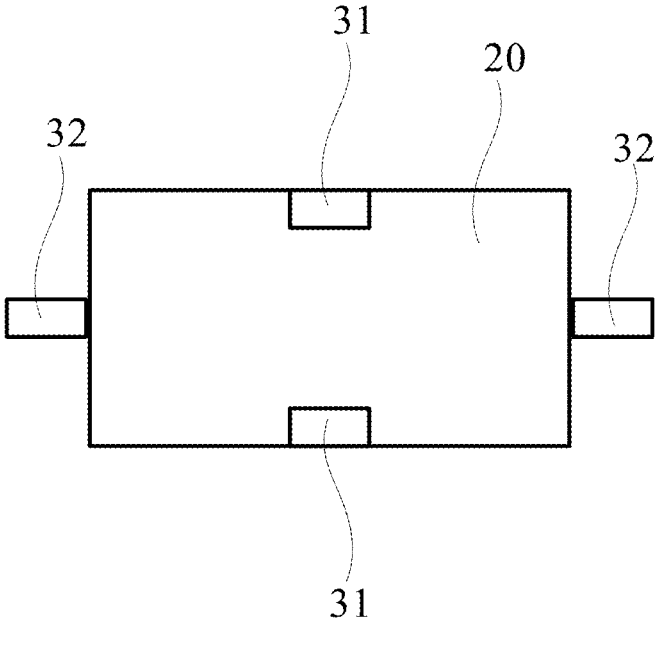
FIG. 5 is a schematic distribution diagram of a moving assembly according to an exemplary embodiment of the present disclosure.

Exemplarily, in some embodiments, please refer to FIG. 5, which illustrates a schematic distribution diagram of the moving assembly 30. As illustrated in FIG. 5, there can be two driving wheels 31 and also two balance wheels 32, the two driving wheels 31 are respectively provided on both sides of the chassis body 20 in the first direction, and the two balance wheels 32 are respectively provided on both sides of the chassis body 20 in the second direction, the first direction is perpendicular to the second direction.

For example, in other embodiments, there can be two driving wheels 31 and one balance wheel 32, or one driving wheel 31 and two balance wheels 32, or three driving wheels 31 and one balance wheel 32, etc.

It should be noted that when the number of driving wheels 31 is greater than one, by adjusting the rotation speed of each driving wheel 31, the robot can be driven to move along a curve.

In some embodiments, as illustrated in FIG. 1, in addition to the balance wheel 32 being rotationally connected to the chassis body 20 through the controllable damping rotating shaft 60, the driving wheel 31 illustrated in FIG. 1 can also be rotationally connected to the chassis body 20 through the controllable damping rotating shaft 60.

The driving wheel 31 can also be provided with the controllable damping rotating shaft 60, so that all wheels are provided with controllable damping rotating shafts 60. As such, the stability of the robot can be controlled in a more refined manner.

In other embodiments, the moving assembly 30 may also be entirely composed of driving wheels 31. For example, four driving wheels 31 are provided on the chassis body 20.

In some embodiments, the suspension shock absorber 50 used in the above embodiments may be a shock absorbing spring.

Please refer to FIG. 6. FIG. 6 illustrates a flow chart of a robot control method according to an exemplary embodiment of the present disclosure. The robot control method can be applied to the robot in any of the aforementioned embodiments. Referring to FIG. 6, the robot control method includes the following steps.

S610, detecting, by the pose detector mounted on the robot body, the pose information of the robot and sending the pose information to the controller.

S620, processing, by the controller, the pose information to generate control information and sending the control information to the controllable damping rotating shaft.

S630, controlling, by the controllable damping rotating shaft, the rotational resistance on the basis of the control information.

In the embodiments of the present disclosure, the pose detector mounted on the robot body can detect the pose of the robot in real time and generate corresponding pose information. After the pose information is generated, the pose information can be sent to the controller. After receiving the pose information, the controller can process the pose information to generate control information, and send the control information to the controllable damping rotating shaft. After receiving the control information, the controllable damping rotating shaft can control the rotational resistance on the basis of the control information.

In some embodiments, rotational resistance can be controlled in a variety of ways. For example, the rotational resistance can be increased, the rotational resistance can be reduced, the rotational resistance can be maintained unchanged, or the like.

On the basis of the robot in the aforementioned embodiments, the above method is used. When the robot body swings, the controllable damping rotating shaft and the suspension shock absorber can jointly provide an acting force opposite to the swing direction of the robot body. Therefore, even if a small suspension stiffness is set, the stability of the robot body can also be ensured, thus taking into account the shock absorption performance of the robot chassis and the stability of the robot body.

Based on the foregoing content, it can be seen that the pose information can be simply expressed as whether tilting is involved and by the direction of tilt. In this case, the controller processing the pose information to generate control information can be, for example: when the pose information is detected to be tilted to the left, the rotational resistance of the controllable damping rotating shaft on the left side is increased; when the pose information is detected to be tilted to the right, the rotational resistance of the controllable damping rotating shaft on the right side is increased; and when the pose information is detected to be not tilted, the rotational resistance of the controllable damping rotating shaft is eliminated.

Based on the above content, it can be seen that the pose information can be expressed in a more refined manner, that is, the pose information can include the pose swing amplitude. In this case, the controller processing the pose information to generate control information includes: the controller determining the target amplitude range corresponding to the pose swing amplitude; and the controller determining the control information corresponding to the target amplitude range according to the preset corresponding relationship between the amplitude range and the control information.

In the embodiments of the present disclosure, the corresponding relationship between the amplitude range and the control information is pre-stored in the controller. For example, when the amplitude range is 0~4.999 degrees, the control information is to control the rotational resistance of the controllable damping rotating shaft on the left side to be 50 N; when the amplitude range is 5~9.999 degrees, the control information is to control the rotational resistance of the controllable damping rotating shaft on the left side to be 100 N; when the amplitude range is 0~−4.999 degrees, the control information is to control the rotational resistance of the controllable damping rotating shaft on the right side to be 50 N; when the amplitude range is −5~−9.999 degrees, the control information is to control the rotational resistance of the controllable damping rotating shaft on the right side to be 100 N, and so on.

Therefore, after receiving the pose information, the controller can determine the target amplitude range according to the pose swing amplitude range that the pose information falls into, and then further determine the corresponding control information according to the pre-stored corresponding relationship between the amplitude range and the control information.

In the embodiments of the present disclosure, the controller determines the target amplitude range corresponding to the pose swing amplitude; and the controller determines the control information corresponding to the target amplitude range according to the preset corresponding relationship between the amplitude range and the control information. As such, the variable damping rotating shaft can be controlled in a more refined manner, and the stability of the robot can be further maintained.

According to one or more embodiments of the present disclosure, the exemplary embodiment 1 provides a robot, which includes: a robot body, a pose detector being mounted on the robot body; a chassis body provided at a bottom of the robot body; a moving assembly connected to the robot body through a suspension shock absorber, the moving assembly being further connected to a controllable damping rotating shaft, and rotationally connected to the chassis body through the controllable damping rotating shaft; and a controller electrically connected to the pose detector and the controllable damping rotating shaft, respectively, and used to control the controllable damping rotating shaft to change rotational resistance according to pose information of the robot detected by the pose detector.

According to one or more embodiments of the present disclosure, the exemplary embodiment 2 provides the robot of the exemplary embodiment 1, the controllable damping rotating shaft includes a rotating damping control device and a rotating shaft, the rotating damping control device is electrically connected to the controller, and the rotating shaft is connected to the moving assembly through a connecting rod.

According to one or more embodiments of the present disclosure, the exemplary embodiment 3 provides the robot of the exemplary embodiment 2, the rotating damping control device includes a DC motor, an electronically controlled resistor is connected in series in a power supply line of the DC motor, and an end of an output shaft of the DC motor is fixedly connected to an end of the rotating shaft.

According to one or more embodiments of the present disclosure, the exemplary embodiment 4 provides the robot of the exemplary embodiment 2, the rotating damping control device includes a DC motor, a frequency switch is connected in series in a power supply line of the DC motor, and an end of an output shaft of the DC motor is fixedly connected to an end of the rotating shaft.

According to one or more embodiments of the present disclosure, the exemplary embodiment 5 provides the robot of the exemplary embodiment 2, the rotating damping control device includes a magnetic field excitation device and a magnetorheological material, and the magnetorheological material is provided in a gap between the rotating shaft and a shaft hole where the rotating shaft is located.

According to one or more embodiments of the present disclosure, the exemplary embodiment 6 provides the robot of any one of the exemplary embodiments 1-5, the moving assembly includes a driving wheel and a balance wheel, the driving wheel and the balance wheel are connected to the robot body through suspension shock absorbers, respectively, and the balance wheel is rotationally connected to the chassis body through the controllable damping rotating shaft.

According to one or more embodiments of the present disclosure, the exemplary embodiment 7 provides the robot of the exemplary embodiment 6, the driving wheel is rotationally connected to the chassis body through the controllable damping rotating shaft.

According to one or more embodiments of the present disclosure, the exemplary embodiment 8 provides the robot of the exemplary embodiment 6, two driving wheels are provided, the two driving wheels are respectively provided on both sides of the chassis body in a first direction, two balance wheels are provided, and the two balance wheels are respectively provided on both sides of the chassis body in a second direction, and the first direction is perpendicular to the second direction.

According to one or more embodiments of the present disclosure, the exemplary embodiment 9 provides a robot control method applied to the robot of any one of the exemplary embodiments 1 to 8, the method including: detecting, by the pose detector mounted on the robot body, pose information of the robot and sending the pose information to the controller; processing, by the controller, the pose information to generate control information, and sending the control information to the controllable damping rotating shaft; and controlling, by the controllable damping rotating shaft, rotational resistance on a basis of the control information.

According to one or more embodiments of the present disclosure, the exemplary embodiment 10 provides a method of the exemplary embodiment 9, the pose information includes a pose swing amplitude, and the processing, by the controller the pose information to generate the control information includes: determining, by the controller, a target amplitude range corresponding to the pose swing amplitude; and determining, by the controller, control information corresponding to the target amplitude range according to a preset corresponding relationship between an amplitude range and the control information.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

What is claimed is:

1. A robot, comprising:
a robot body, a pose detector being mounted on the robot body;
a chassis body provided at a bottom of the robot body;
a moving assembly connected to the robot body through a suspension shock absorber, the moving assembly being further connected to a controllable damping rotating shaft, and rotationally connected to the chassis body through the controllable damping rotating shaft; and
a controller electrically connected to the pose detector and the controllable damping rotating shaft, respectively, and used to control the controllable damping rotating shaft to change rotational resistance according to pose information of the robot detected by the pose detector, wherein the controllable damping rotating shaft comprises a rotating damping control device and a rotating shaft, the rotating damping control device is electrically connected to the controller, and the rotating shaft is connected to the moving assembly through a connecting rod.

2. The robot according to claim 1, wherein the rotating damping control device comprises a DC motor, an electronically controlled resistor is connected in series in a power supply line of the DC motor, and an end of an output shaft of the DC motor is fixedly connected to an end of the rotating shaft.

3. The robot according to claim 2, wherein the moving assembly comprises a driving wheel and a balance wheel, the driving wheel and the balance wheel are connected to the robot body through suspension shock absorbers, respectively, and the balance wheel is rotationally connected to the chassis body through the controllable damping rotating shaft.

4. The robot according to claim 3, wherein the driving wheel is rotationally connected to the chassis body through the controllable damping rotating shaft.

5. The robot according to claim 1, wherein the rotating damping control device comprises a DC motor, a frequency switch is connected in series in a power supply line of the DC motor, and an end of an output shaft of the DC motor is fixedly connected to an end of the rotating shaft.

6. The robot according to claim 5, wherein the moving assembly comprises a driving wheel and a balance wheel, the driving wheel and the balance wheel are connected to the robot body through suspension shock absorbers, respectively, and the balance wheel is rotationally connected to the chassis body through the controllable damping rotating shaft.

7. The robot according to claim 6, wherein the driving wheel is rotationally connected to the chassis body through the controllable damping rotating shaft.

8. The robot according to claim 1, wherein the rotating damping control device comprises a magnetic field excitation device and a magnetorheological material, and the magnetorheological material is provided in a gap between the rotating shaft and a shaft hole where the rotating shaft is located.

9. The robot according to claim 1, wherein the moving assembly comprises a driving wheel and a balance wheel, the driving wheel and the balance wheel are connected to the robot body through suspension shock absorbers, respectively, and the balance wheel is rotationally connected to the chassis body through the controllable damping rotating shaft.

10. The robot according to claim 9, wherein the driving wheel is rotationally connected to the chassis body through the controllable damping rotating shaft.

11. The robot according to claim 9, wherein two driving wheels are provided, the two driving wheels are respectively provided on both sides of the chassis body in a first direction, two balance wheels are provided, and the two balance wheels are respectively provided on both sides of the chassis body in a second direction, and the first direction is perpendicular to the second direction.

12. A robot control method applied to the robot of claim 1, the method comprising:
detecting, by the pose detector mounted on the robot body, pose information of the robot and sending the pose information to the controller;
processing, by the controller, the pose information to generate control information, and sending the control information to the controllable damping rotating shaft; and
controlling, by the controllable damping rotating shaft, rotational resistance on a basis of the control information.

13. The method according to claim 12, wherein the pose information comprises a pose swing amplitude, and the processing, by the controller, the pose information to generate the control information comprises:
determining, by the controller, a target amplitude range corresponding to the pose swing amplitude; and
determining, by the controller, control information corresponding to the target amplitude range according to a preset corresponding relationship between an amplitude range and the control information.

14. The method according to claim 12, wherein the controllable damping rotating shaft and the suspension shock absorber are configured to jointly provide an acting force opposite to a swing direction of the robot body.

15. A computer readable storage medium, on which computer program instructions are stored, the computer program instructions being executed by a processor to cause the processor to: execute steps of the robot control method according to claim 12.

16. The robot according to claim 1, wherein the controllable damping rotating shaft and the suspension shock absorber are configured to jointly provide an acting force opposite to a swing direction of the robot body.

* * * * *